Patented Jan. 26, 1943

2,309,346

UNITED STATES PATENT OFFICE 2,309,346

NONCRYSTALLIZING ROSIN SIZE AND METHOD OF MAKING SAME

Chester G. Landes and Jack T. Cassaday, Stamford, Conn., assignors to American Cyanamid Company, New York, N. Y., a corporation of Maine No Drawing. Application December 12, 1940, Serial No. 369,810

4 Claims. (Cl. 106—238)

This invention relates to rosin size compositions stabilized against crystallization and to methods of preparing the same. More specifically, the invention deals with the problem of inhibiting crystallization in liquid rosin size of the type prepared by saponifying rosin with solutions of alkalies such as sodium carbonate.

The problem of crystal formation in liquid rosin size solutions is extremely troublesome in the commercial utilization of the material. Although such crystallization sometimes occurs during the manufacture or shipment of liquid rosin size, it is most usually encountered in the large storage tanks used by paper mills for maintaining a supply of size solution adequate for continuous operations. New supplies of size solution are usually received in drums or tank cars and are transferred to these storage tanks where the size may be stored for some time before it is used. Crystallization occurring in these storage tanks not only causes a serious loss of size, but the crystals plug up pipe lines and are highly objectionable.

Although rosin sizes prepared from various types of rosin, including both gum rosin and wood rosin, have been known to crystallize, the most serious difficulties have been encountered with sizes prepared by saponifying wood rosin with sodium carbonate solutions. Analysis of the crystals obtained from both wood rosin and gum rosin sizes shows that they consist of a double salt of abietic acid and sodium abietate having the approximate composition of 3 moles of abietic acid for 1 mole of sodium abietate. It is a principal object of our present invention to obtain a liquid rosin size in which the formation of these double-salt crystals is substantially prevented by the addition of a suitable crystallization inhibitor to the rosin size composition.

We have found that a wide variety of materials will either inhibit or lessen materially the degree of crystallization in liquid rosin size when added thereto in stabilizing amounts, by which term we mean relatively small amounts sufficient to prevent excessive crystallization in the liquid rosin size during its storage under ordinary commercial conditions. Ordinarily we find that amounts of 0.1–3% of our crystallization inhibitor, based on the weight of the rosin, are sufficient. Our preferred range is 0.5–1% by weight. These amounts of the most effective of our inhibitors have been found to stabilize wood rosin sizes against crystallization under commercial conditions of storage and use.

The class of inhibitors which we have found to be commercially the most desirable and effective are members of the group of formaldehyde, formaldehyde condensation products, and other stabilizers having formaldehyde or formaldehyde condensation products admixed therewith. Thus, for example, in addition to formaldehyde itself we find that water-soluble urea-formaldehyde condensation products, water-soluble melamine-formaldehyde condensation products, paraformaldehyde, hexamethylene tetramine, water-soluble dicyandiamide-formaldehyde condensation products, casein-formaldehyde mixtures, and condensation products of formaldehyde with sulfonated aromatic compounds such as benzene, naphthalene and anthracene mono- and polysulfonic acids, phenol, cresol and naphthol sulfonic acids and the like are useful as crystallization inhibitors for liquid rosin sizes, and particularly for liquid sizes prepared from wood rosin, when used in stabilizing amounts.

In addition to the crystallization inhibitors of the above-defined class, we have found a number of other compounds which are effective to inhibit or delay crystallization in liquid rosin size and which may be used alone or in admixture with formaldehyde or formaldehyde compounds of the class described above. Typical compounds which do not contain formaldehyde, but which we have found to inhibit or retard crystallization, are ester gum, gelatinous alumina, heat-treated rosin, sodium aluminate, reducing agents such as sodium sulfite and sodium nitrite and esters of polyhydric alcohols with aliphatic dicarboxylic acids such as mannitol maleate, glycerol maleate and the like.

The invention will be illustrated in detail by the following specific example, which describes one method whereby liquid rosin size of the type dealt with by the present invention may be prepared and which also describes and classifies a large number of stabilizers. In this example, the quantities of stabilizer are given on the 100% basis. Thus, for example, when aqueous formaldehyde was employed the percentage and amouns specified refer to the formaldehyde content itself, rather than to the amount of formaldehyde solution.

Example 500 parts by weight of Neros rosin having an optical rotation of +10.3° was weighed into a stainless steel reaction vessel. 9–13% of sodium carbonate, based on the weight of the rosin, was dissolved in 215 parts by volume of distilled water and the solution was heated to boiling. The rosin was then heated to 190–212° F. and maintained within this temperature range while the boiling soda ash solution was added. Heating was then continued for about 6 hours at 190–212° F., during which time additions of 50 parts by volume of hot water were made at half-hour intervals until a total of 300 parts had been added.

During the heating and water addition the solution in the reaction vessel usually became clear and homogeneous after about 1½ hours. Where non-volatile and non-reactive crystallization inhibitors were employed it was found convenient in some cases to add them at this point, but the more volatile or more reactive inhibitors were usually added at the end of the cook.

Samples of the liquid rosin size were tested for crystallization by incubation at 70° C. for long periods of time. Incubation was continued until crystallization had taken place or until enough time had elapsed to establish the fact that the inhibitor added was effective to prevent crystallization. In practically all cases it was found that this method was quite reliable, and that if crystallization at 70° C. was inhibited for a period of about 10 days the size would usually be free from excessive crystallization when stored under commercial conditions.

The following table lists the inhibitors in which no crystallization occurred after incubation at 70° C. for a 10 day period.

*Table I*

| Inhibitor | Amount |
| --- | --- |
|  | Per cent |
| (1) Alpha protein+formaldehyde | 1 |
| (2) Water-soluble urea-formaldehyde condensation product | 1, 2 |
| (3) Water-soluble urea-formaldehyde condensation product (0.5%)+formaldehyde (0.5%) | |
| (4) Casein (0.5%)+formaldehyde (0.5%) | 1 |
| (5) 37% formaldehyde solution | 1 |
| (6) 37% formaldehyde solution containing 6% hexamethylol melamine | 0.5, 1, 2 |
| (7) Hexamethylene tetramine | 1 |
| (8) Di (sulfo-naphthyl) methane (see U. S. Pat. No. 1,336,759) (0.5%)+formaldehyde (0.5%) | 1 |
| (9) Ester gum (2%)+formaldehyde (1%) | |
| (10) Alumina hydrogel (colloidal aluminum hydroxide) | 2 |
| (11) Decolorized wood rosin, heat treated to an optical rotation of +42.5, mixed with Neros rosin before saponification | 1 |
| (12) Sodium aluminate | 5, 10 |
| (13) Sodium nitrite | 2, 0.5, 1 |

Liquid size samples containing the compounds listed in the following table showed no crystallization at 70° C. during the first 5 days and only a few crystals were evident upon incubation for 10 days.

*Table II*

| Inhibitor | Amount |
| --- | --- |
|  | Per cent |
| Water-soluble dicyandiamide-formaldehyde condensation product | 1 |
| Mannitol maleate | 1 |
| Paraformaldehyde | 1 |
| Water-soluble glycerine ester of rosin-maleic acid adduct | 1 |
| Sodium aluminate | 0.5 |
| Sodium sulfite | 1 |

Samples of liquid size containing the compounds listed in Table III showed some crystallization in 5 days or less, but the total amount of crystallization over 10 days was less than in blank samples containing no inhibitor.

*Table III*

| Inhibitor | Amount |
| --- | --- |
|  | Per cent |
| Acetic acid | 1 |
| Albumin | 1 |
| Alpha protein | 1 |
| Aluminum stearate | 1 |
| Benzaldehyde | 1 |
| Casein | 1 |
| Colloidal starch | 1 |
| Formic acid | 1 |
| Gum arabic | 1 |
| Hexamethylene glycol maleate | 1 |
| Mannitol citrate | 1 |
| Sorbitol maleate | 1 |
| Na₂SiO₄ | 1 |
| "Paraflow"—higher alkyl naphthalene—see U. S. Patent 1,815,022 | 1 |

What we claim is:

1. A liquid rosin size composition prepared by saponifying rosin with solutions of alkalies and containing at least one mole of rosin soap for each three moles of unsaponified rosin, said composition being stabilized against crystallization by the incorporation therein of stabilizing amounts of a crystallization inhibitor selected from the group consisting of formaldehyde and water-soluble formaldehyde condensation products.

2. A liquid rosin size composition prepared by saponifying rosin with solutions of alkalies and containing at least one mole of rosin soap for each three moles of unsaponified rosin, said composition being stabilized against crystallization by the incorporation therein of stabilizing amounts of formaldehyde.

3. A liquid rosin size composition prepared by saponifying rosin with solutions of alkalies and containing at least one mole of rosin soap for each three moles of unsaponified rosin, said composition being stabilized against crystallization by the incorporation therein of stabilizing amounts of a water-soluble urea-formaldehyde condensation product.

4. A liquid rosin size composition prepared by saponifying rosin with solutions of alkalies and containing at least one mole of rosin soap for each three moles of unsaponified rosin, said composition being stabilized against crystallization by the incorporation therein of stabilizing amounts of a water-soluble melamine-formaldehyde condensation product.

CHESTER G. LANDES.
JACK T. CASSADAY.